United States Patent [19]
Neuner

[11] 3,855,590
[45] Dec. 17, 1974

[54] CYCLIC OR MONITORING SYSTEM FOR DISPLAYING THE OUTPUT OF TWO SUBSTANTIALLY SIMILAR TRAINS OF LOGIC

[75] Inventor: James A. Neuner, Pittsburgh, Pa.

[73] Assignee: Westinghouse Electric Corportion, Pittsburgh, Pa.

[22] Filed: Apr. 4, 1972

[21] Appl. No.: 240,939

[52] U.S. Cl. .................. 340/413 R, 340/213 R
[51] Int. Cl. ........................... G08b 23/00
[58] Field of Search ................. 340/413 R

[56] References Cited
UNITED STATES PATENTS

| | | |
|---|---|---|
| 3,483,555 | 12/1969 | Birard ............... 340/413 R |
| 3,495,074 | 2/1970 | Jacques ............. 340/413 X |
| 3,516,061 | 6/1970 | Joyaux .............. 340/413 X |
| 3,543,267 | 11/1970 | Morris .............. 340/413 R |
| 3,594,789 | 7/1971 | Rotier .............. 340/413 R |
| 3,618,082 | 11/1971 | Feulner ............. 340/413 R |
| 3,689,887 | 9/1972 | LaFalce ............. 340/413 X |

Primary Examiner—Harold I. Pitts
Attorney, Agent, or Firm—D. C. Abeles

[57] ABSTRACT

A monitoring system for displaying the outputs of two substantially similar trains of logic, cyclicly, on the same display unit. The display alternately indicates the respective outputs of the two trains, cyclicly. Switching means are additionally provided to produce an alternate display of the "ORed" function of the corresponding outputs of the two logic trains.

7 Claims, 2 Drawing Figures

CYCLIC OR MONITORING SYSTEM FOR DISPLAYING THE OUTPUT OF TWO SUBSTANTIALLY SIMILAR TRAINS OF LOGIC

CROSS-REFERENCE TO RELATED APPLICATIONS

The present application is related to the inventions described in copending applications: Ser. No. 240,938 (W. E. Case 43,135), entitled "Communication Between Redundant Protection and Safeguards Logic Systems Within A Nuclear Reactor Power Plant by Means of Light," filed Apr. 4, 1972; and copending application Ser. No. 241,049 (W. E. Case 43,137) entitled "A Programmable Tester for Protection and Safeguards Logic Functions," filed Apr. 4, 1972. All the aforementioned applications have a common inventor in the invention of the subject application and are assigned to the assignee thereof.

BACKGROUND OF THE INVENTION

The present invention pertains in general to monitoring systems for displaying the outputs of two substantially similar trains of logic and more particularly, to such a system that cyclicly displays the respective outputs from each of the corresponding logic trains on the same display unit.

The safe operating status of a nuclear power plant is ensured by its protection and safeguards logic system which receives approximately 200 input signals and upon the correct combination and sequence of those inputs commands the required emergency actuations needed to protect both personnel and equipment. The actuations include: insertion of shutdown rods, containment spray, containment isolation, emergency diesel startup, etc.

A protection and safeguards logic system, such as the one previously described in copending application Ser. No. 240,938 (W. E. Case 43,135), must, because of its vital plant function, provide a standard of reliability that will pass the single failure criteria set by Governmental regulation. To accomplish this standard, most protection and safeguards logic systems comprise two identical logic trains, each receiving identical signals from four bistable channels, with each train capable of causing the required actuations independent of the other. The two logic trains and the four bistable channels are each isolated, electrically and physically, from all others so that a catastrophic failure in one train cannot destroy the other. Additionally, the system as a whole is periodically tested to minimize the possibility that a coincidental failure in two or more units could prevent a required actuation.

To keep the reactor plant operator informed and provide a permanent record of the events before and after an actuation, all inputs and outputs of each logic train are displayed in the reactor control room as well as presented to the reactor computer. If all 200 inputs and approximately 50 outputs of each logic train were displayed separately, the resulting control room display would become both expensive and confusing. Similarly, the required input capability of the computer would raise the cost of the computer and the amount of field wiring required would be excessive. In order to avoid this confusion and expense, the corresponding signals from the respective logic trains are wire "ORed" before being sent to the control room and computer. The resultant outputs provide most of the required information, inasmuch as an error signal or actuation in either train will appear as an error signal or actuation in both logic trains.

The primary disadvantage of the system presently employed is its inability to be tested completely in an overlapping manner. As each bistable is tested, the operator in the control room observes the display to ensure that error signals reach both logic trains. Unfortunately, because of the "OR" function presently employed between logic trains, the operator can never be sure if the signal reached both trains or only one. Consequently a given function in one train can be defective without being detected until the corresponding function in the opposite train also fails, resulting in a total loss of the protection provided by that function.

Accordingly, a need exists for an improved display system with the capability of displaying all of the required information to ensure a complete, overlapping test, while minimizing display expenses, computer inputs, field wiring, and plant operator confusion.

SUMMARY OF THE INVENTION

Briefly, this invention satisfies existing requirements by maintaining the "OR" function between the corresponding signals within the respective logic trains, while providing an additional, alternate mode of operation, (A + B), which can be employed to check the operation of either or both logic trains. When the A + B mode is employed, error signals and actuations are displayed in a cyclic manner on the same output, one train at a time. Thus, the control room display indicates signals first from one train only, then from the other train only, then from the first train only, etc. In this way, the display takes on one of three states. The first state, the ON state, indicates that the bistable error signal reached both logic trains. The second state, the OFF state, indicates that the bistable error signal reached neither train. The third state, appearing as a FLASHING signal, indicates that the bistable error signal reached only one train.

The apparatus, to be described, for providing such a display basically comprises two logic circuitry gates, one associated with each train. Each gate receives inputs from its corresponding logic train and from a clock logic train. The first of the two logic gates is responsive to each clock pulse to provide an output representative of its corresponding logic train. The second logic gate is responsive to the clock pulse to provide an output representative of its logic train intermediate of each clock pulse. The respective outputs from each gate are "OR'ed" to an appropriate display. Switching means are provided having at least one position for effectively bypassing the affect of the gating circuitry so as to continuously provide the corresponding outputs from the two respective logic trains to the "OR" function.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Within all nuclear power plants, some form of protection and safeguards system exists. The purpose of the system is to monitor specific points within the plant and under certain predetermined conditions to command the actuations required to protect both personnel and equipment. Inasmuch as this system assures the safe operating status of nuclear power plants under fault conditions, it must be designed to meet the single failure criteria set by Governmental regulation. Accordingly, two trains of identical logic are employed which receive identical signals and control separate actuators. Each train is periodically tested to assure that no single failure can prevent the necessary actuations via both trains of logic. Additionally, the two logic trains are completely separated, electrically and physically, to assure that in the event of a single failure, of either train, the other trail will provide the necessary actuations.

Such a protection and safeguards logic system has previously been described in copending application Ser. No. 240,938 (W. E. Case 43,135), entitled "Communication Between Redundant Protection and Safeguards Logic Systems Within Nuclear Reactor Power Plants by Means of Light."

Figure 1:
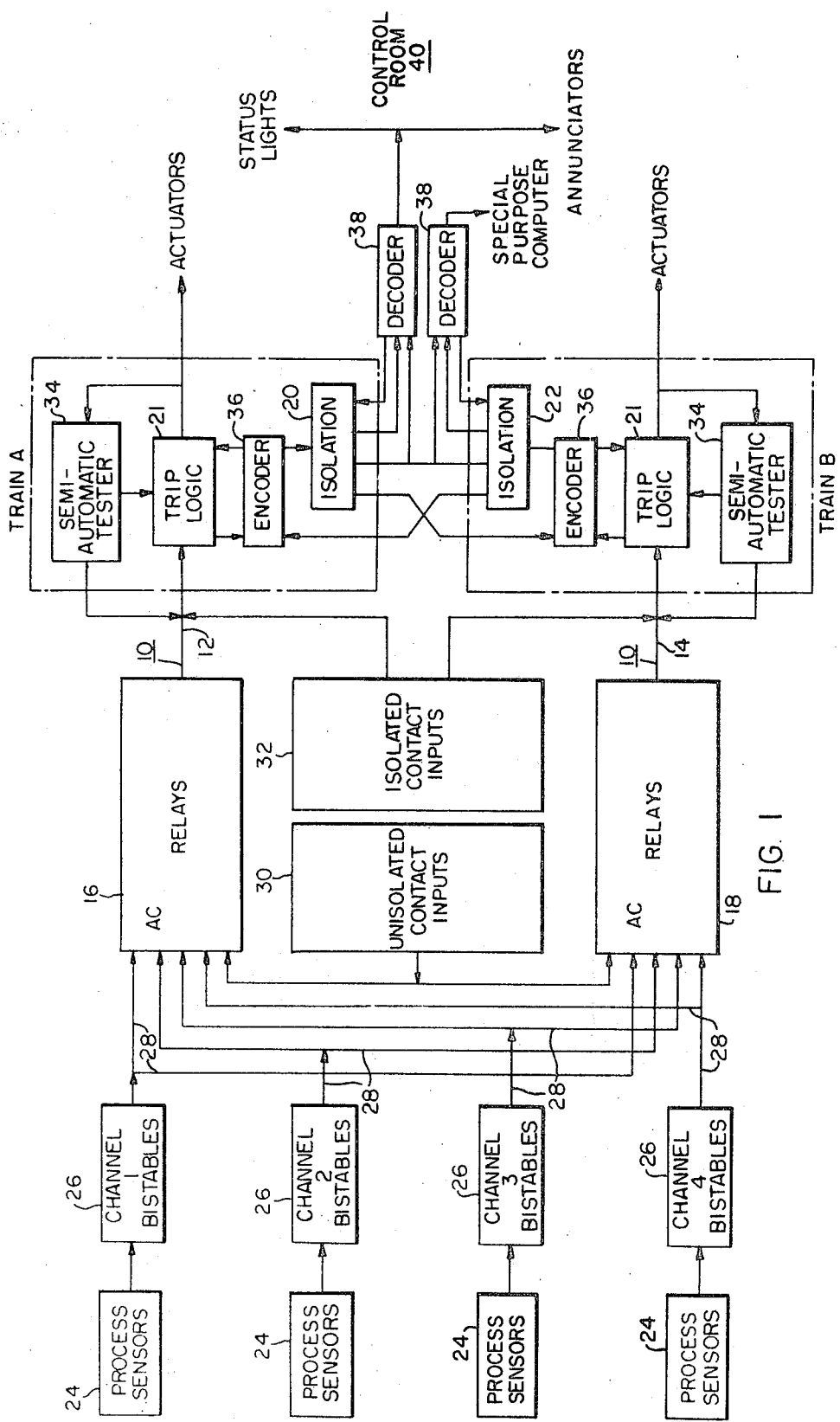
FIG. 1 is a block diagram summary description of a protection and safeguards logic system.

As an illustrative example, FIG. 1 provides a block diagram of a general arrangement of solid state protection and safeguards system components. The solid state reactor protection and safeguards logic system illustrated includes two identical, isolated, redundant trains of logic 10. Complete physical and electrical separation of the respective trains, 12 and 14, is accomplished by virtue of coil to contact separation provided by AC relays 16 and 18, photo diode coupled pairs 20 and 22, and physical separation of wiring as generally illustrated.

Signals originating at the sensors 24 are in themselves redundant inasmuch as separate sensors are employed to monitor the same or related parameters. The analog signals produced by the process sensors 24 are converted to digital form by four channels of bistables 26. In order to maintain separation of the redundant signals, one signal output 28 from each bistable 26 controls two small AC relay coils, one within each of the respective AC relay units 16 and 18. The coil to contact separation of these AC relays assures separation of each bistable channel and each logic train from all others. The AC relays are grouped according to their bistable channel association within the separate AC relay units 16 and 18. In this way, separation of bistable to relay coil wires can be maintained. Signals originating at single contacts or solid state devices must enter each logic train via AC or DC relays 30, as if associated with a bistable channel, so as to maintain the desired separation. Signals already existing at two isolated outputs (e.g., separate contacts) can be considered already isolated and be brought directly into each logic train as illustrated by isolated contact inputs block 32.

Each logic train receives exactly the same information. Upon the proper combination of inputs and sequence of events, as controlled by the trip logic circuitry 21, either logic train is capable of actuating the proper equipment to take corrective action as described in copending application Ser. No. 241,038 (W. E. Case 42,844).

The several outputs from the separate trip logic circuitry 21, associated with each logic train, are multiplexed via encoders 36 to photocoupled isolation devices 20 and 22, as previously described in copending application Ser. No. 240,938 (W. E. Case 43,135). The outputs of the isolation devices 20 and 22 are then wire OR'ed to the control room 40 through decoders 38 for display.

A manually initiated, programmable, semi-automatic tester 32, as previously described in copending application Ser. No. 241,049 (W. E. Case 43,137), is provided as an integral part of each logic train for checking the proper operation of any of the basic logic functions employed within the trip logic 21. The tester simulates all possible logic input combinations and compares the logic function's output with that desired, providing an indication of a malfunction when a discrepancy is determined. Additional testing features assure the proper operation of the tester and provide the capability of sequentially testing each of the plurality of logic functions associated with the trip logic unit 21.

This invention provides the further capability of continuously monitoring the outputs of both logic trains to determine whether either train has malfunctioned. The monitoring system of this invention can be employed in conjunction with the semi-automatic testing units 34 to provide an overlapping test of both logic trains at the same time. The display of this invention maintains the "OR" function between corresponding signals in opposite trains, while additionally providing an alternate mode of operation, designated (A + B) for convenience, for use during the bistable test. When in the A + B mode, error signals and actuations are displayed in a cyclic manner from one train at a time. Thus, the control room display shows signals from train 12 only, then train 14 only, then train 12 only, etc. In this way the display takes on one of three states. The first state, which will appear in the control room on the status lights as an ON signal, indicates that the bistable error signal reached both trains. In the second state the status lights within the control room will remain OFF, indicating the bistable error signal reached neither train. In the third state, the status lights within the control room will flash, indicating that the bistable error signal reached only one train.

Figure 2:
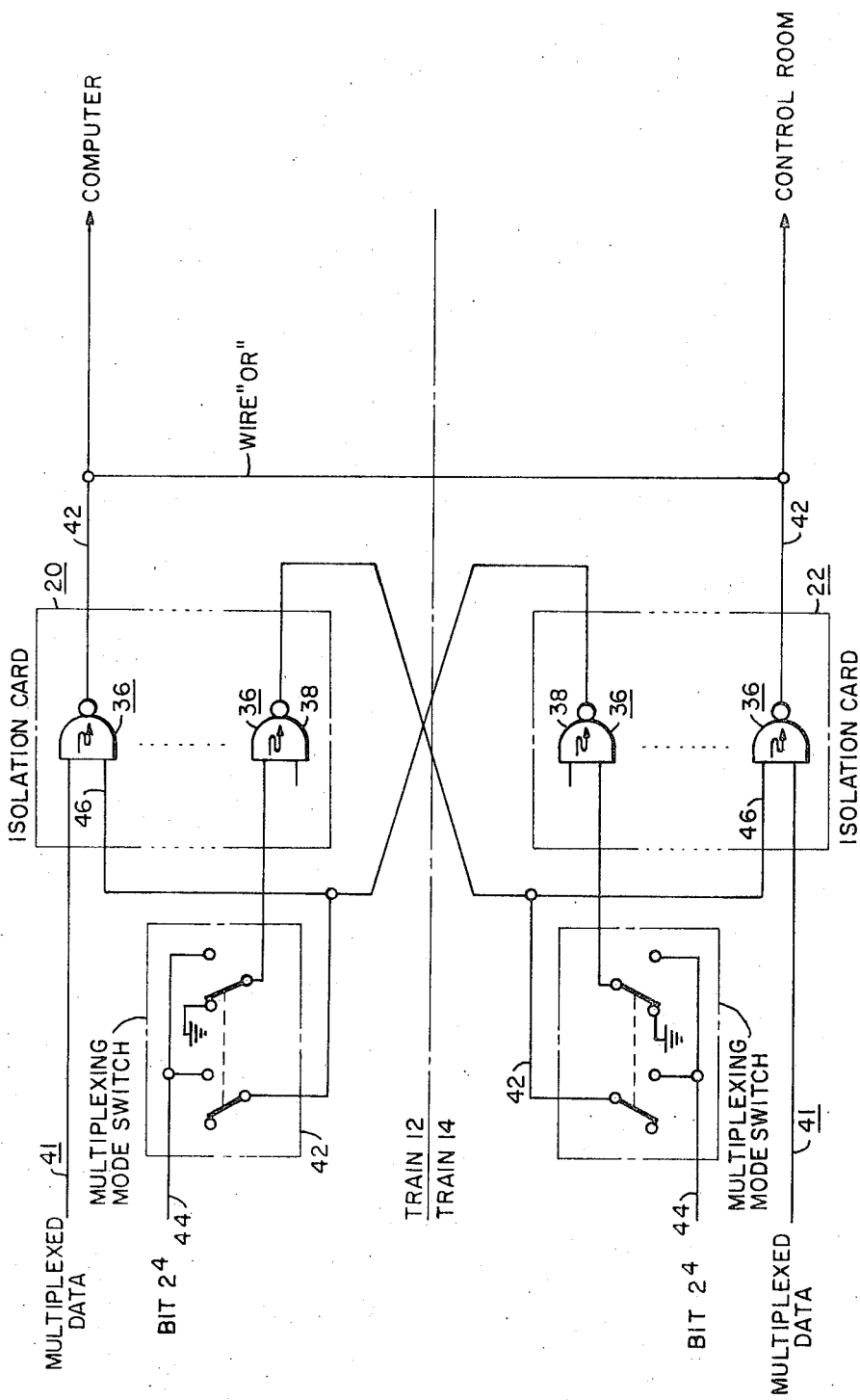
FIG. 2 is a schematic diagram of one embodiment of this invention.

The logic employed in this exemplary embodiment to implement the described cyclic "OR" monitoring and display system of this invention is illustrated in FIG. 2. Each isolation unit 20 and 22, as previously described in copending application Ser. No. 240,938 (W. E. Case 43,135), contains eight isolation circuits, each operating similar to a high threshold logic NAND gate, except that the output is completely isolated from the input. Accordingly, the gates 36 are represented as NAND gates with an arrow inside. The eighth isolation circuit within each of the respective isolation units is completely separated and isolated from the other seven, as described in copending application Ser. No. 240,938 (W. E. Case 43,135). Each of the set apart isolation circuits within the respective isolation units is provided with an input from the corresponding multiplexing mode switch within the separate logic trains. The respective outputs of the isolation circuits 38 are communicated to one input on each of the other seven isolation circuits within the opposite logic train. The second input to each of these seven isolation circuits is coupled to the corresponding multiplex data input 41. The corresponding outputs from the isolation circuits are then wired OR'ed to the computer and control room.

The multiplexing mode switches 42, as previously described in copending application Ser. No. 241,049 (W. E. Case 43,137), are basically three position switches, two positions of which are illustrated in FIG. 2. The multiplexing mode switches 42, in the position illustrated, will provide a continuous gating signal through the set apart isolation circuits 38 to the seven related isolation circuits 36 within the opposite logic train. Thus, in the multiplexing mode switch position shown, the seven related isolation circuits will function as a simple inverter, inverting the multiplex data to the respective decoders 38 for communication to the computer and control room.

If the multiplexing mode switch 42, in either train 12 or 14, is repositioned to connect the $2^4$ clock logic train 44, the isolation units 20 and 22 will function to display the information presented by the multiplex data 41 in a cyclic manner. The $2^4$ bit logic clock train illustrated in this exemplary embodiment is the corresponding bit train associated with the tester clock and counter arrangement illustrated in copending application Ser. No. 241,049 (W. E. Case 43,137). It should be understood, however, that any clock logic train bit arrangement can be used for this purpose. When the clock train 44 is connected via the multiplexing mode switch, the cyclic A + B mode will function as set forth previously. The isolation circuit 38 corresponding to the logic train having the multiplexing mode switch 42 set in the A + B mode position will receive an input directly from the clock train 44 and provide an inverted clock train output to the respective seven related isolation circuits associated with the opposite logic train. The multiplex data associated with the opposite train will then be presented in the control room intermediate of each clock pulse. Similarly, the seven related isolation circuits 36 associated with the logic train having the multiplexing mode switch 42 set in the A + B mode position will receive gating signals directly from the clock train 44 and provide the corresponding multiplexed data to the control room and computer upon the occurrence of each positive clock pulse.

Thus, when the multiplexing mode switches are both in the position indicated in FIG. 2 the system will operate normally, providing a simple "OR'ed" function of the corresponding logic train output signals. If either multiplexing mode switch is set in the right position, clock bit $2^4$ will be communicated to one train and the inverse of clock bit $2^4$ will be communicated to the other train. Consequently, the error signals will be received from only one train at a time in a slow cyclic manner. Accordingly, the three output states previously cited are established: the ON state indicating that the bistable error signal reached both trains; the OFF state indicating that the bistable error signal reached neither train; and the FLASHING state indicating that the bistable error signal reached only one train.

Thus, the invention enables a simple, overlapping, complete test of the entire system with a maximum amount of information being supplied to the reactor plant operator in a simple manner with a minimum of confusion. Additionally, this invention enables the display, computer, and field wiring costs to be minimized, while maintaining the identical nature of each of the logic trains 12 and 14, for simplicity. The multiplexing mode switch arrangement further enables the operator to choose between the state of the art OR'ed outputs or the A + B mode display.

I claim as my invention:

1. A cyclic monitoring and display system for alternately displaying the outputs of two substantially identical trains of logic comprising:
   a clock for generating a continuous train of logic clock pulses;
   a first means for gating a first of said two trains of logic having an input from said clock train and providing an output representative of said first logic train upon the occurrence of each clock pulse;
   a second means for gating a second of said two trains of logic having an input from said clock train and providing an output representative of said second logic train intermediate of each clock pulse;
   means for "OR'ing" the outputs of said first and second gating means; and
   means for displaying said "OR'ed" outputs.

2. The cyclic monitoring and display system of claim 1 including means for inverting said clock train and wherein said second gating means is responsive to said inverted clock train to provide an output upon the occurrence of each inverted clock pulse.

3. The cyclic monitoring and display system of claim 1 including switching means having at least one position for effectively bypassing the affect of said first and second gating means so as to continuously present the corresponding outputs from said first and second logic trains to said "OR'ing" means.

4. The cyclic monitoring and display system of claim 1 wherein said first and second gating means respectively function as two input NAND gates having one input from the corresponding first and second logic trains and a second input from said clock train.

5. An improved nuclear reactor protection and safeguards system having a plurality of sensors for monitoring reactor and environmental parameters associated with reactor operation, the sensors respectively providing an output representative of the monitored parameters which is communicated along two substantially redundant identical binary trains of logic, wherein the improvement comprises:
   means for cyclicly displaying the corresponding outputs from the respective logic trains on the same annunciator in the output display unit.

6. The nuclear reactor protection and safeguards system of claim 5 wherein said cyclic display means comprises:
   a clock for generating a continuous train of logic clock pulses;
   a first means for gating a first of said two trains of logic having an input from said clock train and providing an output representative of said first logic train upon the occurrence of each clock pulse;
   a second means for gating a second of said two trains of logic having an input from said clock train and providing an output representative of said second logic train intermediate of each clock pulse;
   means for "OR'ing" the outputs of said first and second gating means; and
   means for displaying said "OR'ed" outputs.

7. The nuclear reactor protection and safeguards system of claim 6 including switching means having at least one position for effectively bypassing the affect of said first and second gating means so as to continuously present the corresponding outputs from said first and second logic trains to said "OR'ing" means.

* * * * *